United States Patent Office 3,038,890
Patented June 12, 1962

3,038,890
CHEMICAL MANUFACTURE
John G. Abramo and Earl C. Chapin, Springfield, Mass., assignors to Monsanto Chemical Company, St. Louis, Mo., a corporation of Delaware
No Drawing. Filed Mar. 25, 1960, Ser. No. 17,456
4 Claims. (Cl. 260—82.1)

The present invention is directed to elastomeric materials and more particularly to synthetic copolymers or interpolymers exhibiting elastomeric properties and containing available hydroxy groups.

Copolymers of styrene and butadiene exhibit elastomeric properties and so are widely used in applications such as automobile tires, footwear, etc. These copolymers, however, suffer certain shortcomings in that they are susceptible to attack by hydrocrabons in addition to exhibiting poor adhesion to metal, wood, glass, fibrous, etc. surfaces. To illustrate, it has been found that the pounding resulting from high speeds and rough roads causes the tire cords to become separated from the tire casings fabricated from these copolymers resulting in premature tire failure. These same styrene butadiene copolymers when used in surface coating applications are less than satisfactory because of their incompatibility with other surface coating resins, e.g., urea-formaldehyde or melamine-formaldehyde condensates, alkyd resins, etc.

It is an object of this invention to provide novel copolymers exhibiting elastomeric properties.

Another object is to provide novel elastomeric copolymers containing available hydroxyl groups.

Another object is to provide novel elastomeric copolymers which are compatible with other resinous compositions such as urea-formaldehyde and melamine-formaldehyde condensates, alkyd resins, etc.

Another object is to provide novel elastomeric copolymers which exhibit resistance to attack by hydrocarbons and which can be cured to provide cross-linked materials exhibiting marked adhesion to wood, metal, glass, fibrous, etc. surfaces.

Other objects of the invention will in part be obvious and will in part appear hereinafter.

These and other objects of the invention are obtained in synthetic copolymers derived from interpolymerizing vinylbenzyl alcohols with dienes.

The following examples are given in illustration of the invention. Where parts are mentioned, parts by weight are intended unless otherwise described.

*Example I*

A solution of 100 grams of toluene containing 30 grams butadiene, 10 grams p-vinylbenzyl alcohol, 0.5 ml. ditertiary butyl peroxide and 0.25 ml. tertiary dodecyl mercaptan is charged to a 300 ml. rocking pressure bomb and heated under an inert atmosphere at 140° C. for 16 hours. The reaction product which results is a clear colorless viscous syrup. The copolymer is recovered from the syrup by precipitation from ethanol and is then dried in vacuo at room temperature for 16 hours. The copolymer (17 grams) is a clear, colorless, tough elastomeric material containing 2.44% hydroxyl content (19% p-vinylbenzyl alcohol) which can be dissolved in common solvents such as benzene, toluene, dioxane, etc.

*Example II*

A viscous solution is prepared constituting 1.40 grams of the polymer produced in Example I in 4.20 grams of equal parts xylene and butanol. Two grams of the solution are mixed with 0.10 gram of a 60% solids solution in equal parts of xylene-butanol of a modified partially butylated hexamethylol melamine, to form a clear, colorless solution of the same. A film 13 mil. thickness is cast from the latter onto a 10 mil. steel plate. After being cured in a circulating air oven for 20 min. at 160° C., the film is clear, glossy and colorless in appearance. Additionally, the film is extremely tough; strongly adheres to the plate and remains unattacked by xylene-butanol mixtures, and even after being contacted with these mixtures will not chip or craze when the steel plate is bent.

*Example III*

An autoclave fitted with a stirrer is purged of air and while being maintained under an atmosphere of nitrogen is charged with a solution constituting 70 grams of isoprene, 30 grams of p-isopropenylbenzyl alcohol, 0.2 gram of ditertiarybutyl peroxide and 70 grams of toluene. The autoclave is sealed, stirring is started and is heated at 120° C. under autogenous pressure for 15 hours. Thereafter the autoclave is cooled and opened. The reaction product obtained takes the form of a swollen gel. The toluene solvent is then leached from the copolymer by the steps of heating the gel at 60° C. in 300 ml. of methanol for three hours, followed by decanting of the solution phase which results. The leaching operation is repeated three times. After drying, the copolymer is in the form of a rubbery mass, e.g., has elastomeric properties, and corresponds to nearly 100% yield based on the initial monomeric amounts.

*Example IV*

A solution consisting of 25 parts p-vinylbenzyl alcohol, 75 parts chloroprene, 0.1 part dodecyl mercaptan, 0.2 part tertiary butyl peroxide and 100 parts of toluene is charged to an autoclave fitted with a stirrer. The monomer charge and autoclave are purged with nitrogen beforehand and are maintained under an atmosphere of nitrogen during subsequent operations. After sealing the autoclave, stirring and heating are initiated, the temperature being maintained at 120° C. for 5 hours. Pressure in the system is autogenous. At the end of the heating cycle, the autoclave is cooled and opened. A viscous solution is obtained which is slowly poured with vigorous stirring into 1 liter of methanol. A white polymer material forms a precipitate and is collected in a sintered glass filter cup. The polymer is obtained as a white rubbery solid in 78% yield based on the weight of monomers charged.

*Example V*

The following materials are charged to a 28 oz. bottle:

| | Grams |
|---|---|
| Water | 300 |
| Sodium aralkyl polyether sulfate | 25 |
| $K_2S_2O_8$ | 0.5 |
| Butadiene | 100 |
| p-vinylbenzyl alcohol | 25 |
| t-dodecyl mercaptan | 0.5 |

The bottle and charged materials are purged with nitrogen and maintained under a nitrogen atmosphere. After being sealed with a rubber lined cap, the bottle is rotated end-over-end in a constant temperature bath set at 49° C. for 40 hours. The cap is then punctured and unreacted butadiene is vented off. The reaction product which results is emulsion in form. A sample of the emulsion is evaporated and the conversion of monomers to polymers is determined at 75%. The emulsion is broken by freezing and the polymer is obtained as a white rubbery solid material.

The copolymers of the present invention are derived from interpolymerization of vinylbenzyl alcohols with dienes.

The vinylbenzyl alcohols which can be used as monomeric components include those having the structure:

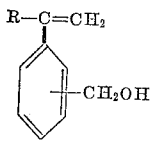

wherein R is selected from the class consisting of hydrogen and methyl radicals. More particularly, the subject alcohols include the o-vinylbenzyl alcohol, m-vinylbenzyl alcohol and the p-vinylbenzyl alcohol when R represents hydrogen; and when R represents a methyl radical the o-isopropenylbenzyl alcohol, m-isopropenylbenzyl alcohol and the p-isopropenylbenzyl alcohol are representative of the subject alcohols. Various simple substituents such as the halogens and alkyl radicals can also be accommodated on the phenyl radical, to provide alcohols intended to be included here. The subject vinylbenzyl alcohols can be produced in the manner set forth in copending application S.N. 747,828, filed July 11, 1958 in the name of John G. Abramo. Mixtures of these alcohols can also be used.

The dienes which can be used as monomeric components 1,3-dienes have the structure:

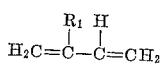

wherein $R_1$ is selected from the group consisting of hydrogen, chlorine and methyl radicals. These include butadiene, chloroprene and isoprene.

Copolymers exhibiting the desired elastomeric properties are those which contain in copolymerized or interpolymerized form 2–80% by weight vinylbenzyl alcohol and 98–20% by weight of 1,3-diene. Accordingly, the copolymers will contain about .25% to 10.0% hydroxy content as determined by weight.

The copolymers of the present invention can be prepared using mass, solution or emulsion polymerization techniques.

In the mass and solution polymerizations, a monomeric mixture is prepared of from 2–80 parts by weight of vinylbenzyl alcohol and from 98–20 parts by weight of conjugated 1,3-diene, parts by weight being on the weight of the total monomers. The monomer mixture is subjected to heating at about 50 to 150° C. under at least autogenous pressure until the monomers become copolymerized or interpolymerized. Copolymerization can be thermally initiated but it is preferred to employ a small quantity of a free radical polymerization initiator such as for example hydrogen peroxide, ditertiarybutyl peroxide, benzoyl peroxide, tertiary-butyl perbenzoate, pinacolone peroxide, ditertiarybutyl hydroperoxide, azo-bis-isobutyronitrile, etc. The amount of such initiator employed will generally fall within the range of about 0.05 to 5.0 parts by weight per 100 parts of total monomers. This may, however, be varied.

The solvents suitable for use in the solution-type of polymerization are organic liquids which are inert to the reaction, e.g., toluene, xylene, benzene, dioxane, etc.

In the emulsion polymerization, a monomeric mixture, prepared as above, is continuously and slowly added to an excess of water maintained at a polymerization temperature of 50 to 150° C. and autogenous pressure. An emulsifying agent and a polymerization catalyst are necessary in carrying out this type of polymerization. Either or both can be initially present in the water in whole or in part, or added as an aqueous solution together with the monomeric mixtures. The amount of water to be used can be varied within wide limits. It is generally preferable, however, to use from about 100–300 parts of water per 100 parts of monomeric mixture in order to obtain aqueous copolymer latices constituting from 25–50% solids by weight.

The identity of the emulsifying agents can be varied. They can be nonionic, anionic or cationic. Those which operate satisfactorily either alone or in mixtures thereof include salts of high molecular weight fatty acids, quaternary ammonium salts, alkali metal salts of rosin acids, alkali metal salts of long-chain sulfates and sulfonates, ethylene oxide condensates of long-chain fatty acids, alcohols or mercaptans, sodium salts of sulfonated hydrocarbons, aralkyl sulfonates, etc. Representative of emulsifiers which can be used are sodium laurate, triethanolamine, sodium lauryl sulfate, 2-ethylhexyl esters of sulfosuccinic acid, sodium salt of dioctyl sulfosuccinic acid, etc. Generally from about 0.1–5.0 parts by weight of emulsifier per 100 parts of total monomer operates quite satisfactorily.

Polymerization initiators or catalysts suitable for use in the emulsion-type polymerizations designed to produce the copolymers of the present invention include free radical initiators such as potassium persulfate, cumene hydroperoxide, ammonium persulfate as well as various of the redox-type catalyst systems represented by combinations of any of hydrogen peroxide, potassium persulfate, cumene hydroperoxide, tertiarybutylisopropyl benzene hydroperoxide, diisopropylbenzene, hydroperoxide, etc., with any of potassium ferricyanide, dihydroxyacetone, sodium formaldehyde sulfoxylate, triethanolamine, glucose, fructose, etc. The amount of initiator utilized conveniently can range from about 0.05–5.0 parts by weight per 100 parts by weight of total monomer. Note that when the redox-type catalysts are used in emulsion-type polymerizations the temperature can range far below the minimum temperature indicated previously. When this embodiment is to be used the system is provided with antifreezes such as methanol, etc., chain regulators such as a mercaptan and an electrolyte such as sodium sulfate, potassium chloride, etc. Using this embodiment, temperatures well below 0° C. and even as low as −35° C. can be used as polymerization temperatures.

The synthetic copolymers of the present invention are clear, essentially colorless elastomeric materials which can be used in linear copolymer form, or as obtained from any of the mass, solution or emulsion processes, to provide a variety of film, coating, molding, etc., applications. Of particular interest, however, and due to the presence of available hydroxyl groups on the backbone of the copolymers of the present invention, they can be compounded with other materials such as melamine-formaldehyde and urea-formaldehyde condensates, alkyd resins as well as other curing agents such as di-isocyanates, di-acid chlorides, etc. Then after being so compounded or mixed and then preliminarily fabricated into films, coatings, moldings, etc., the copolymers can be exposed to elevated temperatures causing them to become cured or cross-linked, with the hydroxyl groups present on the copolymers acting as sites for reaction with the curing agents. Curing can also be facilitated, with or without the use of elevated temperatures, by the uses of catalysts. In this cross-linked form, the copolymers of the present invention retain their elastomeric properties, i.e., are rubbery and flexible in nature while nonetheless evidencing advanced properties of strength, resistance to the usual organic solvents, etc. This is particularly notable in that prior art elastomeric materials such as butadiene-styrene copolymers are incapable of being cured or cross-linked in this manner and consequently are unable to capitalize in the improved properties resulting from the same.

The copolymers of the present invention can also be compounded with various fillers and adjuncts such as colorants, plasticizers, etc.

It will thus be seen that the objects set forth above among those made apparent from the preceding description are efficiently attained and since certain changes may be made in carrying out the above process and in the polymer products which result without departing from the scope of the invention, it is intended that all matter contained in the above description shall be interpreted as illustrative and not in a limiting sense.

What is claimed is:
1. Elastomeric materials comprising copolymers having on the weight of said copolymer in polymerized form 2–80% by weight of vinylbenzyl alcohol having the structure:

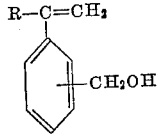

wherein R is selected from the class consisting of hydrogen and methyl radical, and 98–20% by weight of 1,3-diene having the structure:

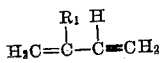

wherein $R_1$ is selected from the class consisting of hydrogen chlorine and methyl radicals.

2. The elastomeric material according to claim 1 wherein the vinylbenzyl alcohol is p-vinylbenzyl alcohol and the 1,3-diene is butadiene.

3. The elastomeric material according to claim 1 wherein the vinylbenzyl alcohol is p-isopropenylbenzyl alcohol and the 1,3-diene is isoprene.

4. The elastomeric material according to claim 1 wherein the vinylbenzyl alcohol is p-vinylbenzyl alcohol and the 1,3-diene is chloroprene.

References Cited in the file of this patent

UNITED STATES PATENTS

| | | |
|---|---|---|
| 2,531,355 | Emerson | Nov. 21, 1950 |
| 2,834,747 | Short | May 13, 1958 |